W. A. ROPP.
ANIMAL TRAP.
APPLICATION FILED MAR. 22, 1920.
1,366,282.
Patented Jan. 18, 1921.
2 SHEETS—SHEET 1.
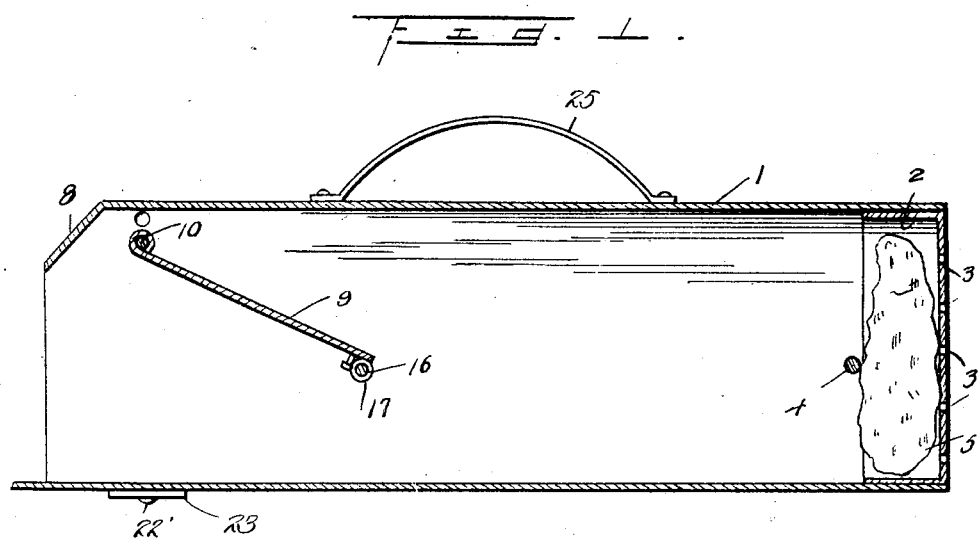
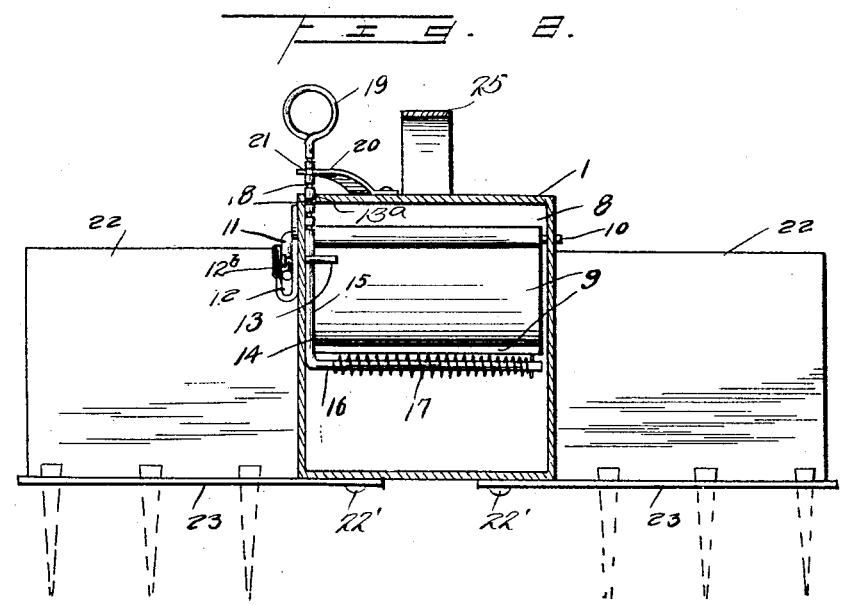
Inventor
W. A. Ropp.

W. A. ROPP.
ANIMAL TRAP.
APPLICATION FILED MAR. 22, 1920.
1,366,282.
Patented Jan. 18, 1921.
2 SHEETS—SHEET 2.
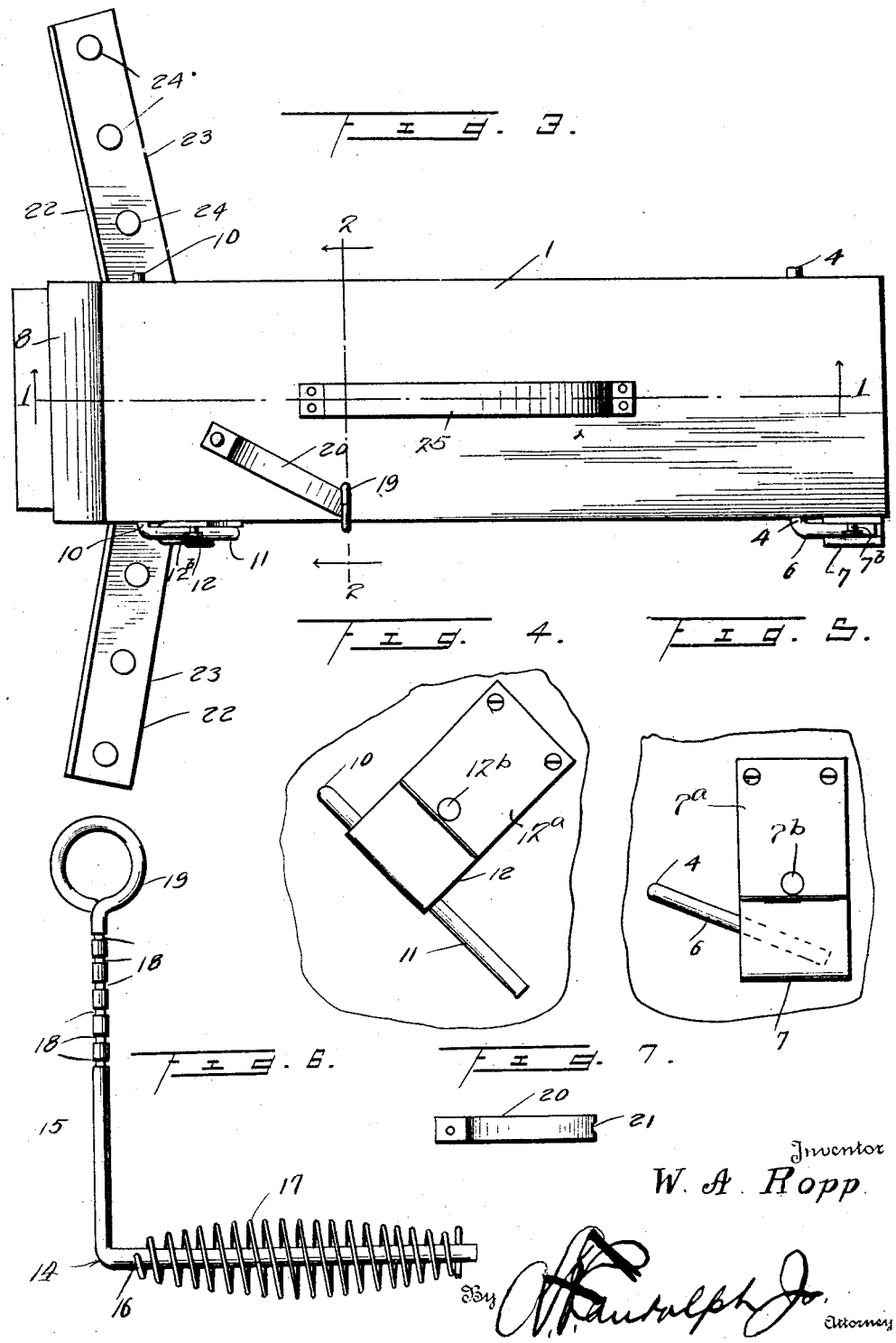

UNITED STATES PATENT OFFICE.

WALTER A. ROPP, OF GIBSON CITY, ILLINOIS.

ANIMAL-TRAP.

1,366,282.

Specification of Letters Patent.  Patented Jan. 18, 1921.

Application filed March 22, 1920. Serial No. 367,803.

*To all whom it may concern:*

Be it known that I, WALTER A. ROPP, a citizen of the United States, residing at Gibson City, in the county of Ford and State of Illinois, have invented certain new and useful Improvements in Animal-Traps; and I do hereby declare the following to be a full, clear, and exact description of the invention, such as will enable others skilled in the art to which it appertains to make and use the same.

This invention relates to animal traps and it consists in the novel features hereinafter described and claimed.

An object of the invention is to provide a trap of simple and durable structure especially adapted to be used for capturing small animals as for instance rabbits, rats, mice and the like and with this object in view the trap comprises a body closed at one end by a perforated head. A bar is disposed transversely across the body in the vicinity of the head and spaced therefrom and is adapted to retain the bait in position in the body. The said bar is removable from the body in order that fresh bait may be placed therein and a securing device is provided for holding the bar in position transversely across the body. A door is hingedly mounted at the opposite end of the body and is adapted to assume an inclined position therein with its free edge resting upon the bottom of the body. Means are provided for protecting the hinged edge portion of the door against the accumulation of snow and ice. An adjustable trigger of especial design is mounted upon the body and adapted to hold the door in an elevated position. Wing members are pivotally attached to the body in the vicinity of that end thereof at which the door is mounted and may be used for anchoring the body to the ground and also serve as leads for directing the animals into the trap.

In the accompanying drawings:

Figure 1 is a sectional view taken on a plane extending centrally and longitudinally through a trap constructed in accordance with my invention.

Fig. 2 is a sectional view taken on the vertical plane indicated by the line 2—2 of Fig. 3, looking in the direction indicated by the arrow.

Fig. 3 is a top plan view of the trap.

Fig. 4 is a view illustrating the clip employed to secure the pivot rod of the door in place and illustrating the manner in which the arm of the pivot rod is secured in the clip.

Fig. 5 is a view illustrating the clip employed to secure the bait retaining rod in place and illustrating the manner in which the arm of the rod is secured in the clip.

Fig. 6 is a detail view in side elevation of the trigger, and

Fig. 7 is a top plan view of the trigger supporting bracket.

The trap comprises a body 1 which may be made of wood, metal or any other material suitable for the purpose. The body is closed at its rear end by a head 2 which is provided with a plurality of perforations 3. A bar 4 extends transversely through the sides of the body 1 in the vicinity of the head 2, and it is adapted to retain the bait 5 in position against the head 2. The bar 4 is provided with an angular arm 6 by means of which it may be applied to secure the bait in place and by means of which it may be removed when it is desired to place new bait in the trap. After the bar 4 has been applied its arm 6 is swung into the loop 7 of a clip 7ª to prevent its accidental displacement. As shown in Fig. 3 of the drawings the upper side of the loop 7 is open, and extending over the open side of the loop is a pin 7ᵇ which prevents the arm 6 from being accidentally swung out of the loop. To permit the arm 6 to be swung into or out of the loop 7 it is only necessary to pull the front side of the loop outwardly beyond the outer end of the guard pin 7ᵇ.

An inclined shield 8 is located at the top of the body 1 at the front or entrance end thereof to prevent snow and ice entering the body. A door 9 is pivoted at its upper end to a rod 10 which extends transversely across the body 1 at the entrance end thereof and in close proximity to the shield 8. The shield 8 will prevent snow and ice from accumulating upon the door 9 and the rod 10 and interfering with the free swinging motion of the door. The pivot rod 10 extends through both sides of the body 1, and it is provided at one end with an angular arm 11 which provides means by which it may be applied and removed. The arm 11 is removably positioned in the loop 12 of a clip 12ª, and such clip secures the rod 10 in place against accidental displacement. As shown in Fig. 3 of the drawings, the upper side of the loop 12 is open, and extending over the open side thereof is a pin 12ᵇ which prevents the arm 11 from being accidentally swung out of the loop. When it is desired to swing the arm 11 into or out of the loop 12 it is only necessary to pull the front side of the loop outwardly beyond the outer end of the pin 12$^b$.

When the door is closed it occupies a downwardly and rearwardly inclined position with its lower or free end resting upon the bottom of the body 1. The door is adapted to be releasably supported in opened position by a trigger 14. The trigger comprises a vertical arm 15 which is rotatably and slidably mounted in an opening 15$^a$ formed in the top of the body 1 adjacent one side thereof. The trigger also comprises a horizontal arm 16 upon which a coil of wire 17 is positioned. The coil 17 is secured to the arm 16 by its ends which extend through the arm. The vertical arm 15 of the trigger is provided with a plurality of relatively spaced notches 18, and at its upper end with a handle 19. A bracket 20 which is secured to the top of the body 1 at the front side of the vertical arm 15 of the trigger is provided with a forked end 21 adapted to receive any one of the reduced portions formed by the notches 18 in the vertical arm 15 of the trigger. The bracket 20 rotatably supports the trigger so that it may be manually turned to position its horizontal arm 16 in door supporting position. When the arm 16 of the trigger is in door supporting position it extends transversely across the body 1, and the free end of the door 9 rests thereon, as shown in Figs. 1 and 2 of the drawings. When an animal enters the trap its back engages the coil 17, and as the result the trigger is turned on the arm 15 as a pivot, and when the arm 16 and the coil 17 are swung clear of the lower end of the door 9 the latter falls into closed position trapping the animal. In order to prevent the arm 15 of the trigger from being swung out of engagement with the fork 21 of the bracket 20 during the operation of the trigger by an animal, a pin 13 is carried by one side of the body 1 and engages the rear side of the arm 15, as shown in Fig. 2 of the drawings. As the vertical arm 15 of the trigger is provided with a plurality of notches 18, and as this arm has a detachable engagement with the fork 21 of the bracket 20, the horizontal arm 16 of the trigger may be supported at various distances from the bottom of the body 1, and as the result thereof the trap may be set to catch animals of different sizes.

Wing members 22 are pivotally connected to the bottom of the body 1 adjacent to the entrance end thereof as at 22'. The wings are provided at their lower edges with flanges 23 each having a series of openings 24. The wing members may be disposed at suitable angles with relation to the sides of the body 1 and may serve as leads for directing animals to the entrance of the trap. As shown in dotted lines in Fig. 2 of the drawings, stakes or pegs may be inserted through the openings 24 and driven into the ground to anchor or secure the trap at any desired point.

In setting the trap, the trigger 14 is rotated through the medium of the handle 19 to swing the horizontal arm 16 out of the path of the free end of the door 9. The door 9 is then swung upwardly, and the trigger 14 is thence swung to position the horizontal arm 16 beneath the free end of the door. On entering the trap, an animal engages the coil 17 upon the horizontal arm 16, and as the result turns the trigger 14 about the vertical arm 15 as a pivot. When the animal reaches a point inwardly beyond the free end of the door member, the horizontal arm 15 will have been moved beyond the free end of the door, resulting in the door gravitating in closed position and the trapping of the animal. To permit the trap to be conveniently carried, a handle 25 is secured to the top wall of the body 1.

Having described the invention what is claimed is:—

1. A trap comprising a body, a perforated head closing one end thereof, a bar disposed transversely across the body in the vicinity of the head and spaced therefrom and a clip mounted upon the exterior of the body and engageable with the bar to hold the same against longitudinal movement.

2. A trap comprising a body, bait retaining means located therein, a shield located in an inclined position over the entrance to the body, a door hingedly mounted in the body and having its hinge located under the shield, a trigger member for holding the free end of the door in an elevated position; wings pivotally connected with the body and adapted to be disposed at angles with relation to the sides thereof.

3. A trap comprising a body, a door hinged therein, a trigger member for holding the door in an elevated position, wing members pivotally connected with the body at the entrance end thereof and having flanges at their lower edges and means engageable with the flanges and adapted to anchor the wings to the ground.

4. A trap comprising a body, a door hinged at its upper end within the body, and a trigger having a vertical arm rotatably mounted in the top of the body and a horizontal arm located within the body and adapted to releasably support the free end of the door.

5. A trap comprising a body, a door hinged at its upper end within the body, a trigger having a vertical arm rotatably mounted in the top of the body and a horizontal arm located within the body and adapted to releasably support the free end of the door, and a coil mounted upon the horizontal arm.

6. A trap comprising a body, a door hinged at its upper end within the body, a trigger having a horizontal arm located within the body and adapted to releasably support the free end of the door and a vertical arm, and means engaging the vertical arm to rotatably support the trigger and to permit vertical adjustment of the trigger.

7. A trap comprising a body, a door hinged at its upper end within the body, a trigger having a horizontal arm located within the body and adapted to releasably support the free end of the door and a vertical arm having a plurality of relatively spaced notches, and means carried by the body engaging in one of said notches to rotatably support the trigger.

8. A trap comprising a body, a door hinged at its upper end within the body, a horizontal trigger arm located within the body and adapted to releasably support the free end of the door, and means for rotatably and adjustably supporting the trigger arm.

In testimony whereof I affix my signature in presence of two witnesses.

WALTER A. ROPP.

Witnesses:
 JOHN C. MCCLURE,
 W. A. DAVIDSON.